(12) United States Patent
Tanaka et al.

(10) Patent No.: US 10,913,324 B2
(45) Date of Patent: Feb. 9, 2021

(54) BLOWER

(71) Applicant: DENSO CORPORATION, Kariya (JP)

(72) Inventors: Yuusuke Tanaka, Kariya (JP); Yasuhiko Niimi, Kariya (JP); Masafumi Kawashima, Kariya (JP)

(73) Assignee: DENSO CORPORATION, Kariya (JP)

(*) Notice: Subject to any disclaimer, the term of this patent is extended or adjusted under 35 U.S.C. 154(b) by 843 days.

(21) Appl. No.: 15/115,705

(22) PCT Filed: Jan. 21, 2015

(86) PCT No.: PCT/JP2015/000258
§ 371 (c)(1),
(2) Date: Aug. 1, 2016

(87) PCT Pub. No.: WO2015/115065
PCT Pub. Date: Aug. 6, 2015

(65) Prior Publication Data
US 2017/0008368 A1 Jan. 12, 2017

(30) Foreign Application Priority Data
Feb. 3, 2014 (JP) .................................. 2014-018459

(51) Int. Cl.
*B60H 1/00* (2006.01)
*F04D 29/42* (2006.01)
(Continued)

(52) U.S. Cl.
CPC ....... *B60H 1/00285* (2013.01); *F04D 29/282* (2013.01); *F04D 29/4226* (2013.01); (Continued)

(58) Field of Classification Search
CPC .. F04D 29/282; F04D 29/441; B60H 1/00285
See application file for complete search history.

(56) References Cited

U.S. PATENT DOCUMENTS 5,511,939 A * 4/1996 Tokunaga .......... B60H 1/00471
415/119
5,813,831 A * 9/1998 Matsunaga ......... F04D 29/4213
415/173.6
(Continued)

FOREIGN PATENT DOCUMENTS

JP 2001315526 A 11/2001
JP 2003097492 A 4/2003
(Continued)

OTHER PUBLICATIONS

Tomoe, Centrifugal Blower, 2009, English Translation (via Google Patents) (Year: 2009).*

*Primary Examiner* — Kenneth Bomberg
*Assistant Examiner* — Michael L Sehn
(74) *Attorney, Agent, or Firm* — Harness, Dickey & Pierce, P.L.C.

(57) ABSTRACT

A blower has a centrifugal multi-blade fan that has blades around a rotation axis and a casing that houses the centrifugal multi-blade fan. The centrifugal multi-blade fan satisfies a relation of $d1/h1 \geq 5$, in which d1 is a diameter of a part having the blades, and h1 is a height of the blades in an axial direction of the rotation axis. A part of the casing on one side in an axial direction of the centrifugal multi-blade fan has an air suction port. A part of the casing on the radial outer side of the centrifugal multi-blade fan has an air passage through which air blown from the centrifugal multi-blade fan flows. The casing has an enlargement portion that enlarges the air passage on at least one of the one side and an other side in the axial direction as the casing extends toward the radial outer side.

19 Claims, 6 Drawing Sheets

(51) Int. Cl.
   *F04D 29/44*      (2006.01)
   *F04D 29/28*      (2006.01)
   *F04D 29/66*      (2006.01)

(52) U.S. Cl.
   CPC ......... *F04D 29/441* (2013.01); *F04D 29/661* (2013.01); *B60H 2001/006* (2013.01)

(56) References Cited

U.S. PATENT DOCUMENTS

| | | | |
|---|---|---|---|
| 2001/0017203 A1 | 8/2001 | Uemura et al. | |
| 2002/0004008 A1* | 1/2002 | Miyata | F04D 29/444 415/206 |
| 2003/0012649 A1* | 1/2003 | Sakai | F04D 29/30 415/206 |
| 2003/0142476 A1 | 7/2003 | Tomioka et al. | |
| 2013/0047367 A1* | 2/2013 | Patrono | A47L 5/22 15/300.1 |
| 2013/0121818 A1 | 5/2013 | Shichiken et al. | |

FOREIGN PATENT DOCUMENTS

| | | |
|---|---|---|
| JP | 2003222098 A | 8/2003 |
| JP | 2006083772 A | 3/2006 |
| JP | 2009013924 A | 1/2009 |
| WO | WO-2011148578 A1 | 12/2011 |

\* cited by examiner

BLOWER

CROSS REFERENCE TO RELATED APPLICATIONS

This application is a U.S. National Phase Application under 35 U.S.C. 371 of International Application No. PCT/JP2015/000258 filed on Jan. 21, 2015 and published in Japanese as WO 2015/115065 A1 on Aug. 6, 2015. This application is based on and claims the benefit of priority from Japanese Patent Application No. 2014-018459 filed on Feb. 3, 2014. The entire disclosures of all of the above applications are incorporated herein by reference.

TECHNICAL FIELD

The present disclosure relates to a blower having a flat centrifugal multi-blade fan.

BACKGROUND ART

Conventionally, as described in Patent Literature 1, a blower includes a centrifugal multi-blade fan and a casing that houses the centrifugal multi-blade fan.

The centrifugal multi-blade fan has blades around a rotation axis. The centrifugal multi-blade fan draws air from a radial inner side and blows the air toward a radial outer side. The casing forms a passage for air blown from the fan.

PRIOR ART LITERATURES

Patent Literature

Patent Literature 1: JP 2001-315526 A

SUMMARY OF INVENTION

A blower for a vehicle seat air-conditioner is generally required to be formed in a small flat shape (i.e., a thin shape) due to constraint on mounting around a seat. Therefore, the centrifugal multi-blade fan and the casing are required to be formed in a small flat shape (i.e., a thin shape).

The vehicle seat air-conditioner supplies a conditioned air generated by a vehicle air-conditioning unit into a seat via a conditioned air duct by the blower, and blows the air toward a passenger from the seat surface, thereby providing highly air-conditioned comfortability.

In the vehicle seat air-conditioner, seat ventilation resistance is high, and effective noise from the blower increases. Therefore, noise reduction by high efficiency of the blower is demanded.

However, according to investigations, the inventors of the application found that a small, flat blower has a small ventilation area and has a different airflow compared to that in the non-flat blower disclosed in Patent Literature 1 described above, and a reverse flow of air is liable to occur from a clearance between a casing and a fan. As a result, a decrease in fan efficiency is likely to occur.

In view of the foregoing circumstances, an object of the present disclosure is to provide a blower that has a flat, centrifugal multi-blade fan and that is able to improve fan efficiency.

A blower of the present disclosure has a centrifugal multi-blade fan and a casing. The centrifugal multi-blade fan has blades around a rotation axis. The centrifugal multi-blade fan draws air from a radial inner side and blows the air to a radial outer side. The casing houses the centrifugal multi-blade fan.

The centrifugal multi-blade fan satisfies a relation of $d1/h1 \geq 5$, in which $d1$ is a diameter of a part having the blades, and $h1$ is a height of the blades in an axial direction of the rotation axis. The part of the casing on one side in an axial direction of the centrifugal multi-blade fan has an air suction port that draws the air. A part of the casing on the radial outer side of the centrifugal multi-blade fan has an air passage through which air blown from the centrifugal multi-blade fan flows. The casing has an enlargement portion that enlarges the air passage on at least one of the one side and an other side in the axial direction as the casing extends toward the radial outer side.

With the structure, an air passage is enlarged in the axial direction of a centrifugal multi-blade fan. Accordingly, air blown into the air passage from the centrifugal multi-blade fan may easily be swirled.

Since a flow direction of air swirled in the air passage is close to a flow direction of another air blown from the centrifugal multi-blade fan, a loss due to an interference of the air swirled in the air passage with another air can be reduced. Furthermore, since the cross-sectional area of the air passage can be enlarged, friction resistance can be decreased. Accordingly, fan efficiency can be improved.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

Referring to FIGS. 1 to 5, a blower according to the present embodiment will be described below. In the drawings, the double-headed arrow oriented up and down indicates a vertical direction of a vehicle.

Figure 1:
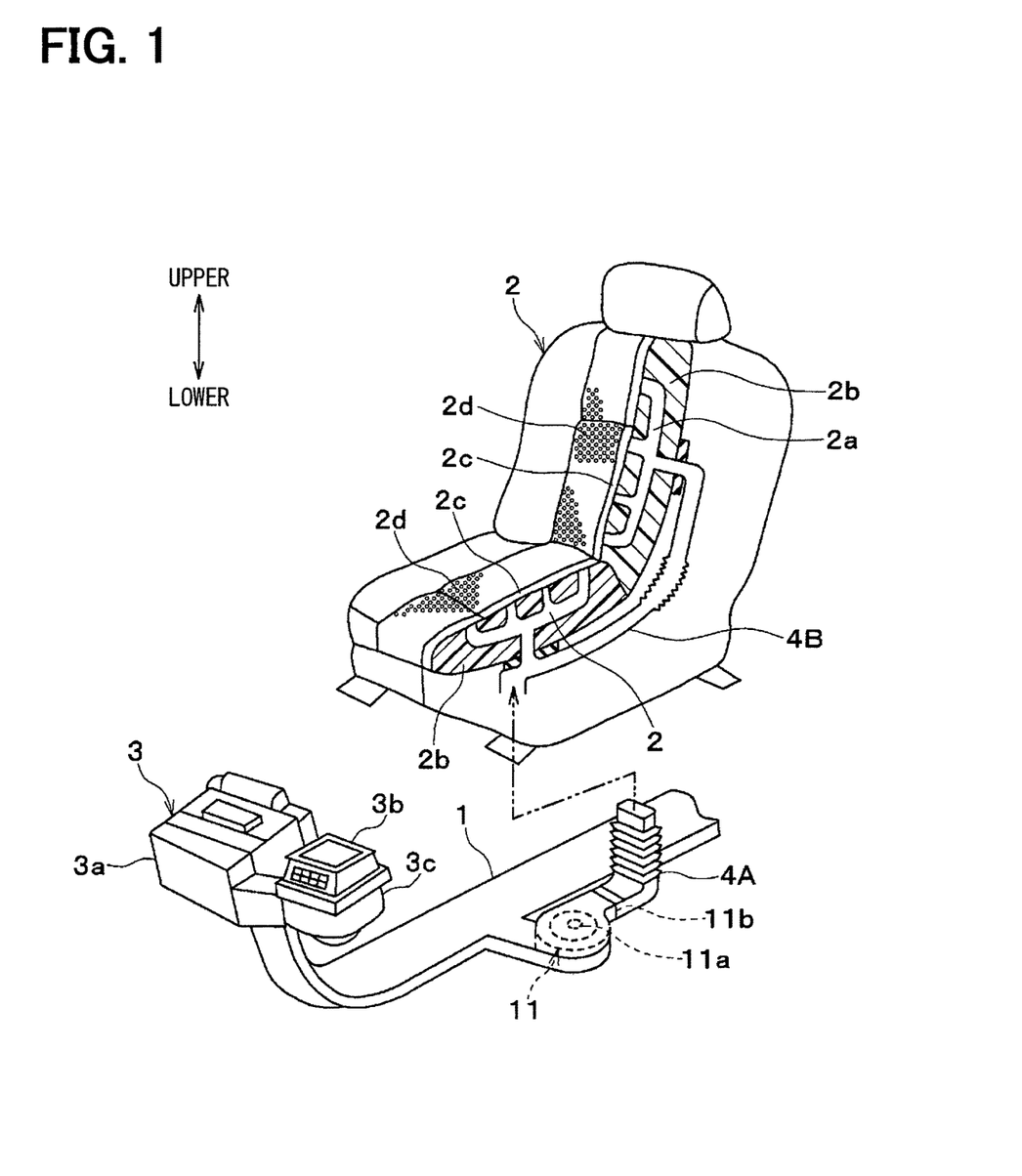
FIG. 1 is a view illustrating an entire configuration of a vehicle seat air-conditioner according to a first embodiment.

As shown in FIG. 1, a blower 11 is applied in a vehicle seat air-conditioner, and blows out air toward a seated passenger.

The blower 11 is disposed under a seat 2, on which a passenger is seated, on a condition of being housed in the intermediate part of a rear foot duct 1. Since the space between the seat 2 and a floor of a vehicle cabin is narrow, the blower 11 has a small flat shape. The blower 11 may be placed on the floor of the vehicle cabin or may be attached to a lower surface of the seat 2.

The rear foot duct 1 is connected to an air conditioner case 3a of an interior air conditioning unit 3. The interior air conditioning unit 3 blows air that is to be blown into the vehicle cabin after adjusting a temperature of the air.

The rear foot duct 1 is a conditioned air duct that blows conditioned air of which temperature is adjusted in the interior air conditioning unit 3 into the vehicle cabin (i.e., a space to be air-conditioned). Specifically, the rear foot duct 1 blows the conditioned air toward foot of the passenger seated on a rear seat of the vehicle.

The rear foot duct 1 is connected to a blow-out opening formed in the air conditioner case 3a. The rear foot duct 1 extends downward from the blow-out opening of the interior air conditioning unit 3 toward the floor of the vehicle cabin and toward a rear side of the vehicle on an upper side of the floor of the vehicle cabin.

The air conditioner case 3a forms an outer shell of the interior air conditioning unit 3 and also forms an air passage in which air that is to be blown into the vehicle cabin flows. The air conditioner case 3a and the rear foot duct 1 respectively have a certain degree of elasticity and are molded from resin (e.g., polypropylene) excellent in strength.

An inside/outside air switching box 3b is connected to a most upstream area of the air conditioner case 3a in a flow direction of air. The inside/outside air switching box 3b is an inside/outside air introducing part that switches and introduces inside air or outside air to the air conditioner case 3a. An inside-air inlet and an outside-air inlet are formed in the inside/outside air switching box 3b. In the inside/outside air switching box 3b, an inside/outside air switching door is disposed to open or close the inside-air inlet and the outside-air inlet.

A blower 3c for the air-conditioning unit is disposed on a downstream side of the inside/outside air switching box 3b in a flow direction of air. The blower 3c for the air-conditioning unit draws inside air or outside air introduced by the inside/outside air switching box 3b and blows the air into an air passage inside the air conditioner case 3a.

An evaporator, a heater core, and an air mixing door are housed in the air conditioner case 3a. The evaporator is a cooling heat exchanger that cools air to be blown into the vehicle cabin by performing a heat exchange between the air flowing in the air conditioner case 3a and refrigerant flowing on a low pressure side of a refrigeration cycle.

The heater core is a heating heat exchanger that heats a part of air after passing through the evaporator. The heater core heats the air after passing through the evaporator by performing a heat exchange between cooling water (i.e., warm water) for cooling an engine and the air after passing through the evaporator.

An air mixing door is a temperature adjusting part that adjusts the temperature of air to be blown into the vehicle cabin, the adjustment being made by continuously changing a volume of cold air caused to flow into the heater core, proportional to a cold air flowing while bypassing the heater core.

Blow-out openings are formed in a most downstream area of the air conditioner case 3a in the flow direction of air. A blowing mode door is disposed on an upstream side of each blow-out opening in the air conditioner case 3a in the flow direction of air. The conditioned air duct is connected to each blow-out opening.

As the blow-out openings, for example, a defroster opening, a face opening, a front foot opening, and a rear foot opening are formed. As the conditioned air ducts, a defroster duct, a face duct, a front foot duct, and the rear foot duct 1 are provided to connect to the blow-out opening.

The defroster opening blows the conditioned air toward a front windshield of the vehicle. The face opening blows the conditioned air toward an upper body of a passenger seated on a front seat of the vehicle. The front foot opening blows the conditioned air toward foot of the passenger seated on a front seat of the vehicle. The rear foot opening blows the conditioned air toward foot of a passenger seated on a rear seat of the vehicle.

The defroster duct is connected to a defroster opening. The face duct is connected to a face opening. The front foot duct is connected to a front foot opening. The rear foot duct 1 is connected to a rear foot duct opening.

An air suction port 11a of the blower 11 is open in the interior of the rear foot duct 1. An air blowing outlet 11b of the blower 11 is connected to an air passage 2a in the seat 2 (i.e., an in-seat air passage) via seat ducts 4A, 4B. The air passage 2a is formed in a seat pad 2b configuring the seat 2.

A large number of pores 2d are formed in a skin 2c covering the seat pad 2b. The pores 2d are provided as air blowing outlet portions through which air flowing in the air passage 2a is blown toward a passenger seated on the seat 2.

Figure 2:
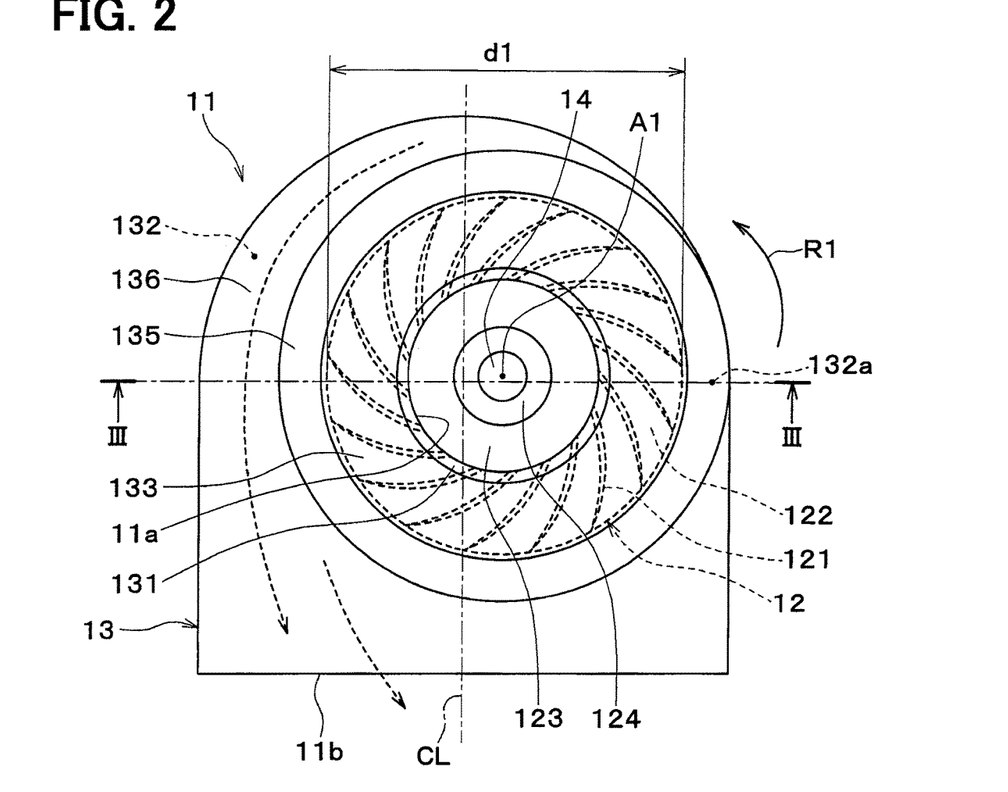
FIG. 2 is a plan view illustrating a blower according to the first embodiment.
Figure 3:
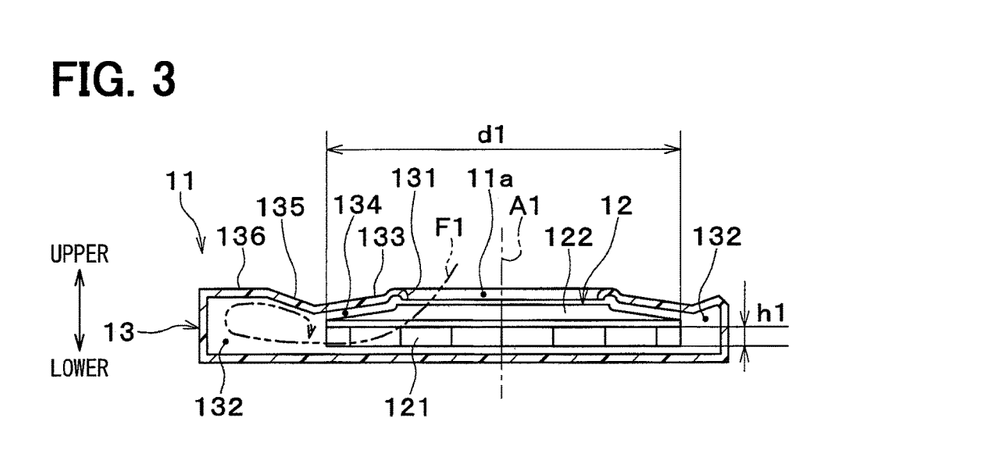
FIG. 3 is a cross-sectional view taken along a line III-III in FIG. 2.

As shown in FIG. 2 and FIG. 3, the blower 11 is a centrifugal blower that has a fan 12 (i.e., an impeller) and a blower casing 13 (i.e., a casing). The blower 11 is a scroll-less blower that does not have a helical (i.e., logarithmic spiral) scroll casing.

The fan 12 has blades 121 (i.e., fins) around a rotation axis A1. The fan 12 is a centrifugal multi-blade fan that draws air from one side (i.e., upper side in FIG. 3) in the direction in which the rotation axis A1 extends, and from a radial inner side, and blows the air toward a radial outer side. Hereinafter, the direction in which the rotation axis A1 extends will be referred to as an axial direction (i.e., a fan axial direction). As shown in FIG. 3, the rotation axis A1 of the fan 12 extends parallel with the vertical direction of the vehicle.

The fan 12 is housed in the blower casing 13. The blower casing 13 has a certain degree of elasticity and is molded from resin (e.g., polypropylene) excellent in strength.

The air suction port 11a is formed in the casing 13. The air suction port 11a opens toward one end (i.e., the upper side in FIG. 3) in the axial direction. A suction port (i.e., a bell mouth) 131 is formed in an outer periphery of the air suction port 11a. The suction port extends toward the inner circumference of the fan 12 and introduces drawn air to the air suction port 11a.

The fan 12 is a turbo fan in which the direction of each blade 121 is opposite to a rotation direction R1 (i.e., a direction of fan rotation). In general, a turbo fan has high fan efficiency and provides a low volume of air as compared to a sirocco fan in which each blade is oriented in the rotation direction.

The fan 12 is a flat fan (i.e., a thin fan) in which a blade diameter d1 and a blade height h1 satisfy a relation of d1/h1≥5. The blade diameter d1 is the diameter (i.e., outside diameter) of the part of the fan 12 having the blades 121. The blade height h1 is a height of the blades 121 in the axial direction.

One end of each of the blades 121 on the one side in the axial direction (i.e., on a side adjacent to the air suction port 11a) is connected by a side plate 122. The side plate 122 is formed into a ring shape, thereby covering the blades 121 from the one side in the axial direction.

The other end (i.e., a side opposite to the air suction port 11a) of each of the blades 121 in the axial direction is connected by a main plate 123 having a circular shape. A boss part 124 is formed in the center of the main plate 123. The boss part 124 is connected to an output shaft 14 of a motor that rotary drives the fan 12.

The blades 121, the side plate 122, the main plate 123, and the boss part 124 have a certain degree of elasticity and are molded from resin (e.g., polypropylene) excellent in strength.

Although not shown, the motor that rotary drives the fan 12 is fixed to a part (i.e., a part on a lower side in FIG. 3) of the blower casing 13 on a side opposite from the air suction port 11a. The motor rotary drives the fan 12 in the direction shown by the arrow R1 in FIG. 2. In the present embodiment, the motor includes an electric motor.

As shown in FIG. 2, the blower casing 13 has a half-elliptic shape when viewed in the axial direction.

An air passage 132 through which air blown out of the fan 12 flows is formed on a radial outer side of the fan 12 in the blower casing 13. Hereinafter, the radial outer side of the fan 12 will be referred to as a fan radial outer side.

The air blowing outlet 11b is formed on the downstream side of the air passage 132 in the blower casing 13 in the flow direction of air. The air blowing outlet 11b blows air after passing through the air passage 132 to an outside of the blower 11.

The air blowing outlet 11b is open in a direction perpendicular to the axial direction. That is, the air blowing outlet 11b is open in a radial direction of the fan 12. Hereinafter, the radial direction of the fan 12 will be referred to as a fan radial direction. The blower casing 13 having the half-elliptic shape has a straight part provided with an end portion (i.e., a lower end portion in FIG. 2), and the air blowing outlet 11b is formed in the end portion. The end portion is located in the blower casing 13 on a side opposite from a semicircular portion of the blower casing 13.

The rotation axis A1 of the fan 12 is offset with respect to a center line CL (i.e., a widthwise center line) in a width direction (i.e., a left-right direction in FIG. 2) of the blower casing 13. The center line CL is an imaginary line. The rotation axis A1 of the fan 12 is offset with respect to the center of the semicircular part of the blower casing 13 having the half-elliptic shape. An offset direction of the fan 12 is 90° away from an opening direction of the air blowing outlet 11b (i.e., a lower direction in FIG. 2) in a rotation direction R1 (i.e., in a rightward direction in FIG. 2).

Accordingly, a width of the air passage 132 in the fan radial direction is the smallest on the offset side (i.e., on the right side in FIG. 2) in which the rotation axis A1 is offset with respect to the center line CL. Hereinafter, the part in which the width of the air passage 132 in the fan radial direction is the smallest will be referred to as a smallest width part 132a. Here, in the fan radial direction, a distance from the smallest width part 132a to the rotation axis A1 is shorter than a distance from the smallest width part 132a to the center line CL.

The air passage 132 extends to the air blowing outlet 11b such that the width of the passage 132 in the fan radial direction increases from the smallest width part 132a in the rotation direction R1.

As shown in FIG. 3, sidewalls of the blower casing 13 (i.e., walls located on the radial outer side of the fan) extend parallel with the axial direction. The bottom surface of the blower casing 13 (i.e., the wall on an other side in the axial direction) has a flat shape perpendicular to the axial direction.

An upper surface (i.e., a wall surface on the one side in the axial direction) of the blower casing 13 has a fan facing portion 133 that faces the fan 12, and the fan facing portion 133 has a shape fitting an upper end (i.e., the side plate 122) of the fan 12. Therefore, a clearance 134 having a fixed width is formed between the fan facing portion 133 and the upper end of the fan 12.

The blower casing 13 has the fan facing portion 133 in the upper surface of the blower casing 13, and the fan facing portion 133 faces the fan 12. An inclined portion 135 is inclined toward the one side in the axial direction (i.e., in an upper side in FIG. 3) from a side adjacent to the fan facing portion 133 toward the radial outer side of the fan.

Thus, the air passage 132 is enlarged on the one side in the axial direction (i.e., on the upper side in FIG. 3) as the air passage 132 extends toward the radial outer side of the fan. The inclined portion 135 is an enlargement portion enlarging the air passage 132 in the axial direction.

A flat portion 136 is located on a radial outer side of the inclined portion 135 in the radial direction of the fan 12 and has a flat shape perpendicular to the axial direction. The inclined portion 135 is inclined at a constant angle along an entire circumference of the fan 12. The position of the flat portion 136 in the axial direction is constant along the entire circumference of the fan 12.

Next, an operation with the above-described configuration will be described. When the fan 12 is rotary driven by a motor (not shown), the fan 12 draws, through the air suction port 11a of the blower casing 13, the conditioned air flowing in the rear foot duct 1 after a temperature of which is adjusted by the interior air conditioning unit 3, and blows the air into the air passage 132 of the blower casing 13.

The air blown into the air passage 132 from the fan 12 is blown into the seat duct 4A through the air blowing outlet 11b. The air blown into the seat duct 4A from the air blowing outlet 11b flows in the seat duct 4B and the air passage 2a within the seat 2, and is blown, through the large number of pores 2d in the skin 2c of the seat 2, toward a passenger seated on the seat 2.

Hereinafter, one end of each blade 121 on the radial inner side of the fan 12 will be referred to as a blade inlet, and an other end of the blade 121 on the radial outer side of the fan will be referred to as a blade outlet. The fan 12 draws air from the blade inlet and blows the air from the blade outlet.

The air passage 132 of the blower casing 13 is enlarged on the one side in the axial direction (i.e., on the upper side in FIG. 3). Accordingly, as indicated by the arrow F1 in FIG. 3, air blown toward the radial outer side of the fan from the blade outlet of the fan 12 collides with the side wall of the blower casing 13, and then flows and swirls along the upper surface of the blower casing 13. The upper surface is configured by the inclined portion 135 and the flat portion 136.

An air swirling in the air passage 132 flows in substantially the same direction as a flow direction of other air blown by the fan 12. Therefore, a loss caused by interference of the air with the other air can be reduced. Furthermore, frictional resistance can be reduced since a ventilation area (i.e., a cross-sectional area of the air passage 132) is enlarged. Accordingly, fan efficiency can be improved.

In the flat fan in which the blade diameter d1 and the blade height h1 satisfies a relation of d1/h1≥5, as indicated by the arrow F1 in FIG. 3, a flow of air blown toward the radial outer side of the fan from the blade outlet of the fan 12 has a velocity component toward the one side in the axial direction (i.e., upwards in FIG. 3). Hereinafter, the above-described flow of air will be referred to as a blowing flow from the fan 12.

The air passage 132 is enlarged toward the one side in the axial direction (i.e., upwards in FIG. 3) such that the air passage 132 extends in a direction coinciding with a flow direction of the blowing flow. Thus, the blowing flow from the fan 12 can be swirled satisfactorily.

Figure 4:
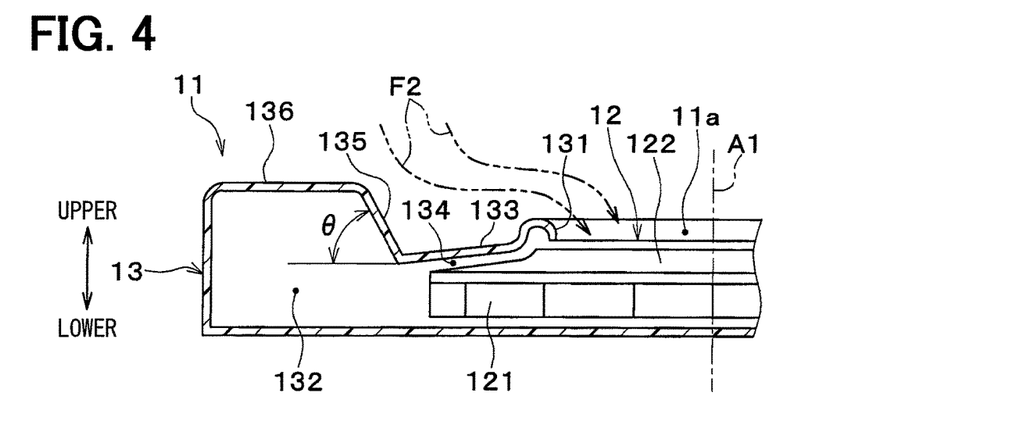
FIG. 4 is a cross-sectional view illustrating the blower according to the first embodiment.

The inclination angle θ of the inclined portion 135 will now be described. As shown in FIG. 4, the inclination angle θ is the angle of the inclined portion 135 with respect to an imaginary plane perpendicular to the rotation axis A1 of the fan 12.

Figure 5:
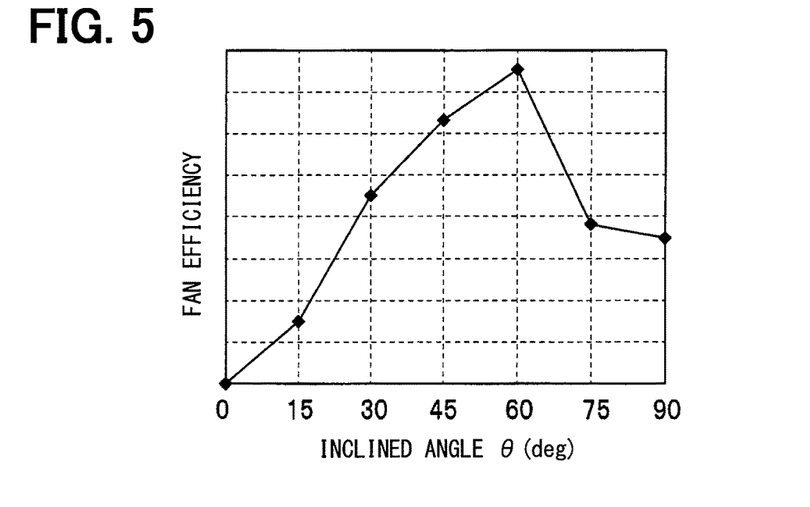
FIG. 5 is a graph showing a relation between an inclination angle of the blower according to the first embodiment and fan efficiency.

As shown in FIG. 5, fan efficiency is remarkably improved in a case where an inclination angle θ is in a range of 30° to 90°, preferably, 30° to 75°. This is because the ventilation area is enlarged, and the blowing flow from the fan 12 becomes a stable swirling flow.

As shown in FIG. 4, it is preferable that the flat portion 136 of the blower casing 13 is enlarged to be located above the air suction port 11a and the suction port 131. As a result, as indicated by the arrows F2 in FIG. 4, airflows can be smoothly guided to the air suction port 11a, and thus airflows are collected.

In the present embodiment, as shown in FIG. 3, the blower casing 13 has the inclined portion 135 that enlarges the air passage 132 toward the one-end or the other side in the axial direction as the inclined portion 135 extends toward the radial outer side.

Accordingly, air blown from the centrifugal multi-blade fan 12 to the air passage 132 can swirl easily since the air passage 132 is enlarged in the axial direction of the centrifugal multi-blade fan 12 (refer to FIG. 3).

The air swirling in the air passage 132 flows in substantially the same direction as the flow direction of the other air blown by the fan 12. Therefore, the loss caused by interference of the air with the other air can be reduced. Furthermore, since the area of the air passage 132 is enlarged, frictional resistance can be reduced.

Thus, since fan efficiency can be improved, a reduction of noise in the blower 11 can be achieved.

For example, the inclined portion 135 is formed to extend beyond the suction port 131 in the axial direction toward the one side in the axial direction. In other words, a distance between an end of the inclined portion 135 on the one side in the axial direction and a surface (i.e., a bottom surface) of the blower casing 13 on the other side in the axial direction is longer than a distance between the suction port 131 and the surface of the casing 13 on the other side in the axial direction. With the structure, airflows are smoothly guided to the air suction port 11a and can be collected (see FIG. 4).

For example, the inclined portion 135 inclines at an angle in a range of 30° to 90° with respect to an imaginary plane perpendicular to the rotation axis A1. Accordingly, fan efficiency can be improved certainly since the blowing flow of air blown from the centrifugal multi-blade fan 12 into the air passage 132 is turned into a stable swirling flow (see FIG. 5).

For example, the inclined portion 135 inclines at an angle in a range of 30° to 75° with respect to an imaginary plane perpendicular to the rotation axis A1. Accordingly, fan efficiency can be improved more certainly (see FIG. 5).

Second Embodiment

Figure 6:
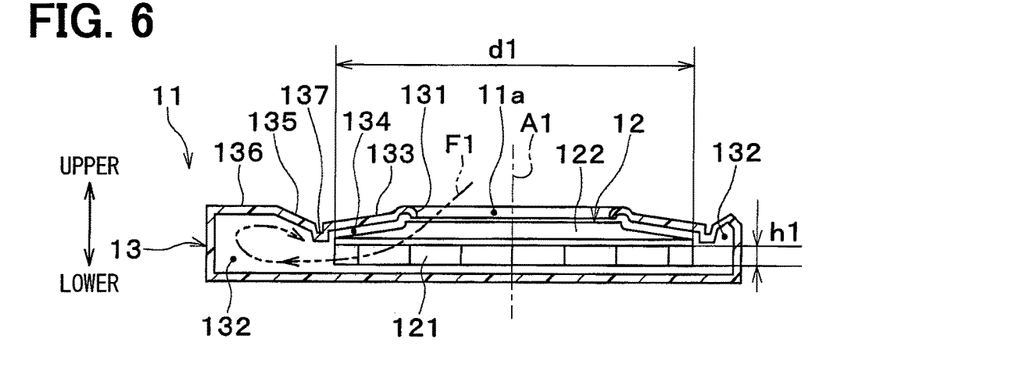
FIG. 6 is a cross-sectional view illustrating a blower according to a second embodiment.

In the present embodiment, as shown in FIG. 6, a recessed portion 137 is formed in the upper surface (i.e., a surface on the one side in the axial direction) of the blower casing 13, in a part near the outlet of each blade 121. The recessed portion 137 is recessed toward the bottom surface of the blower casing 13 (i.e., downward in FIG. 6).

Accordingly, a swirling flow in the air passage 132 is prevented from being guided into the clearance 134 between the blower casing 13 and the fan 12. As a result, a reverse flow of air toward the air suction port 11a from the air passage 132 through the clearance 134 can be restricted. Therefore, fan efficiency can be improved.

That is, according to the present embodiment, a surface of the blower casing 13 on the one side in the axial direction has the recessed portion 137 recessed toward the other side in the axial direction and restricts a reverse flow of air to the suction port 131 from the air passage 132. Thus, fan efficiency can be improved.

Third Embodiment

Figure 7:
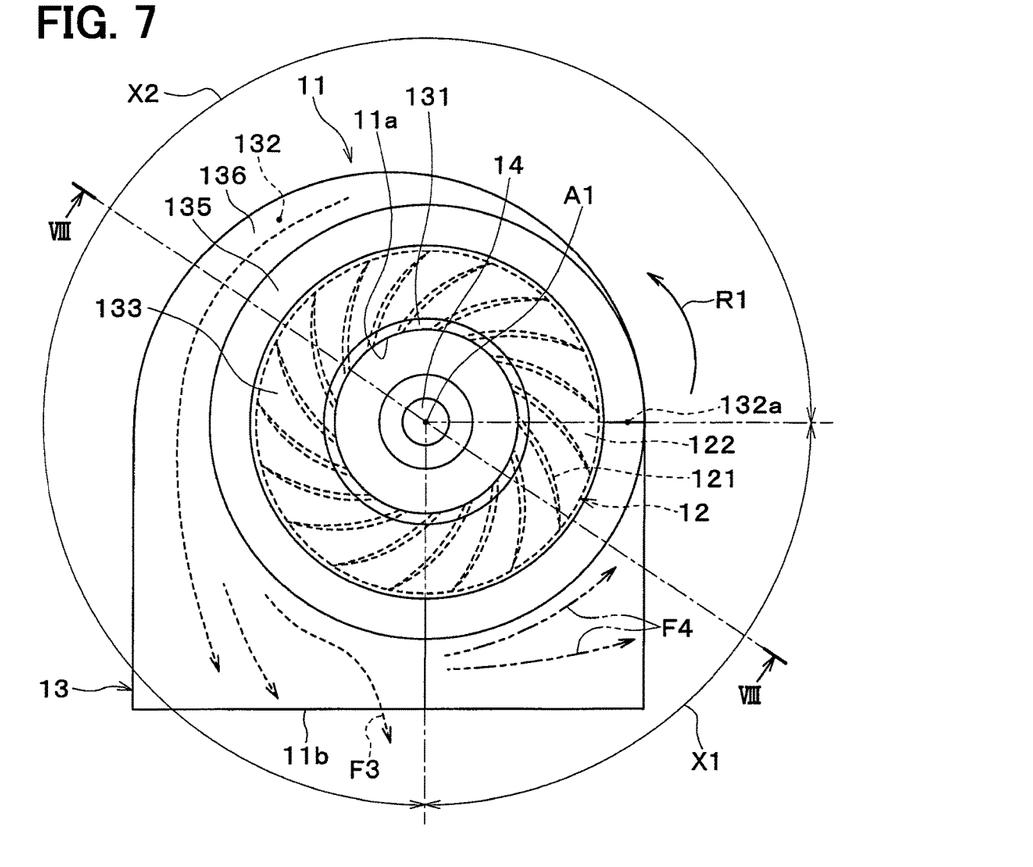
FIG. 7 is a plan view illustrating a blower according to a third embodiment.

According to the above-described embodiments, the inclination angle θ of the inclined portion 135 of the blower casing 13 is constant along the entire circumference of the fan 12. However, according to the present embodiment, as shown in FIG. 7 and FIG. 8, the inclination angle θ of the inclined portion 135 varies.

Specifically, a first inclination angle θ1 that is the inclination angle of a first area X1 is smaller than a second inclination angle θ2 that is the inclination angle of a second area X2.

The first area X1 is an area within 90° from the smallest width part 132a of an air passage 132 in the direction opposite to the rotation direction R1. The second area X2 is an area other than the first area X1 (i.e., the remaining area). That is, the second area X2 is an area within 270° from the smallest width part 132a of the air passage 132 in the rotation direction R1.

Figure 8:
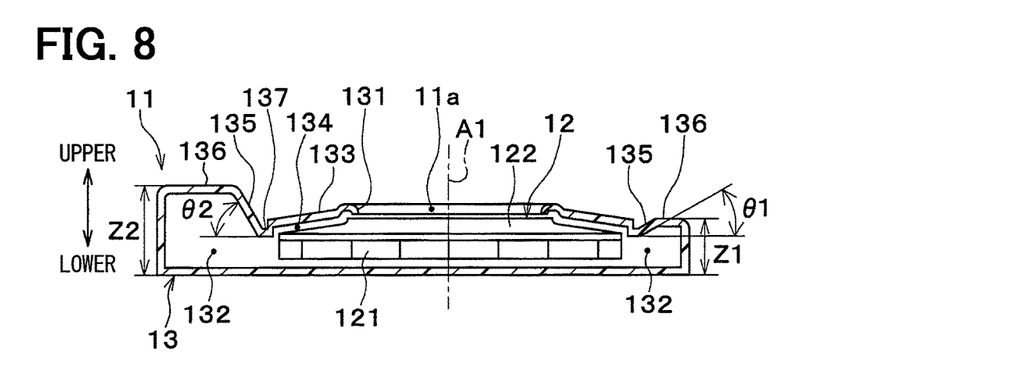
FIG. 8 is a cross-sectional view taken along a line VIII-VIII in FIG. 7.

In the example in FIG. 8, the first inclination angle θ1 of the first area X1 is 30°, and the second inclination angle θ2 of the second area X2 is 60°.

A height of the part forming the air passage 132 of the casing 13 in the axial direction changes since the inclination angle θ of the inclined portion 135 changes. Hereinafter, the height in the axial direction will be referred to as the casing height.

Specifically, a first casing height Z1 that is the casing height in the first area X1 is smaller than a second casing height Z2 that is the casing height in the second area X2.

As indicated by the arrow F3 in FIG. 7, air flowing in the rotation direction R1 in the air passage 132 is guided toward the air blowing outlet 11b in a boundary area between the second area X2 and the first area X1. That is, the inclination angle θ of the inclined portion 135 becomes smaller in the boundary area between the second area X2 and the first area X1. As a result, the airflow from the second area X2 to the first area X1 is restricted.

As indicated by the arrows F4 in FIG. 7, the airflow can be prevented from colliding with the side wall of the blower casing 13 and reflowing in the air passage 132 without being blown from the air blowing outlet 11b. Therefore, a pressure loss caused by a turbulence in the airflow can be reduced, and a volume of air blown from the air blowing outlet 11b can be increased. Accordingly, fan efficiency can be improved.

In the first area X1 and the second area X2, the inclination angle θ may be gradually increased in the rotation direction R1.

Alternatively, in the first area X1 and the second area X2, the inclination angle θ of the inclined portion 135 may be fixed, and the casing height may be gradually increased in the rotation direction R1.

In the inclined portion 135 of the present embodiment, the first inclination angle θ1 in the first area X1 is smaller than the second inclination angle θ2 in the second area X2.

With the structure, air flowing in the air passage 132 can be guided toward the air blowing outlet 11b. As a result, a pressure loss caused by the turbulence in the airflow can be reduced, and a volume of air blown from the air blowing outlet 11b can be increased. Accordingly, fan efficiency can be improved.

In the casing 13 of the present embodiment, the first casing height Z1 in the first area X1 is smaller than the second casing height Z2 in the second area X2.

With the structure, air flowing in the air passage 132 can be guided toward the air blowing outlet 11b. Therefore, a pressure loss caused by the turbulence in the airflow can be reduced, and a volume of air blown from the air blowing outlet 11b can be increased. Accordingly, fan efficiency can be improved.

Fourth Embodiment

Figure 9:
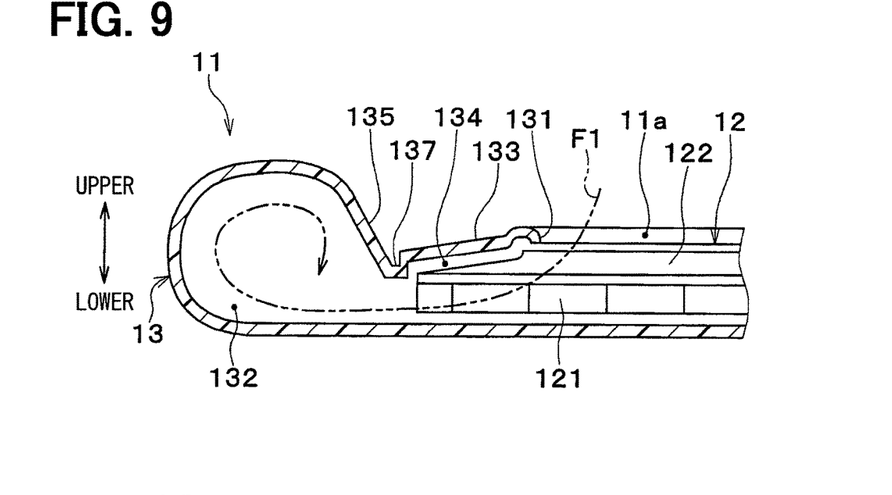
FIG. 9 is a cross-sectional view illustrating a blower according to a fourth embodiment.

According to the above-described embodiments, the cross-sectional shape of the part of the blower casing 13 forming the air passage 132 is approximately rectangular. However, as shown in FIG. 9, the cross-sectional shape of the part of the blower casing 13 forming the air passage 132 may be a circular or elliptic tube.

Accordingly, the airflow can be swirled stably in the air passage 132. As a result, friction loss in the air passage 132 can be reduced, thereby fan efficiency can be improved.

Fifth Embodiment

Figure 10:
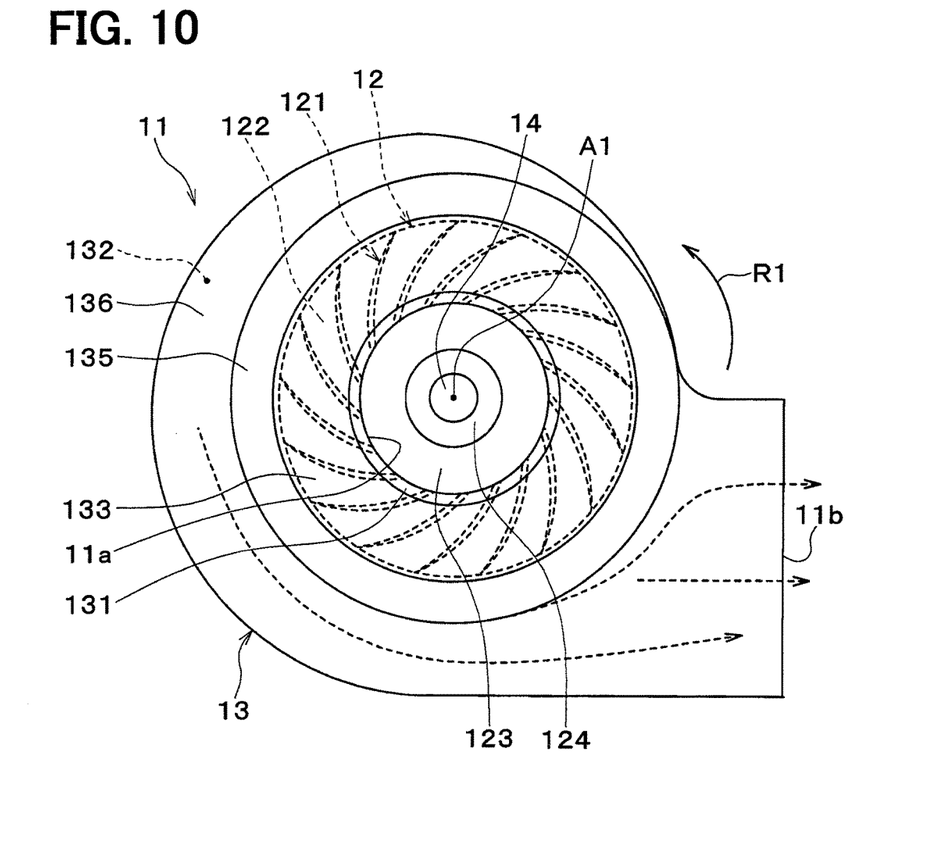
FIG. 10 is a cross-sectional view illustrating a blower according to a fifth embodiment.

According to the above-described embodiments, the blower 11 is a scroll-less blower that does not have a helical (i.e., logarithmic spiral) scroll casing. However, as shown in FIG. 10, the blower 11 may be a scroll blower that has a helical (i.e., logarithmic spiral) scroll casing. That is, the blower casing 13 may be formed into a helical (i.e., logarithmic spiral) shape.

Accordingly, fan efficiency can be improved since the flow of air in the air blowing outlet 11b can be stable.

Sixth Embodiment

Figure 11:
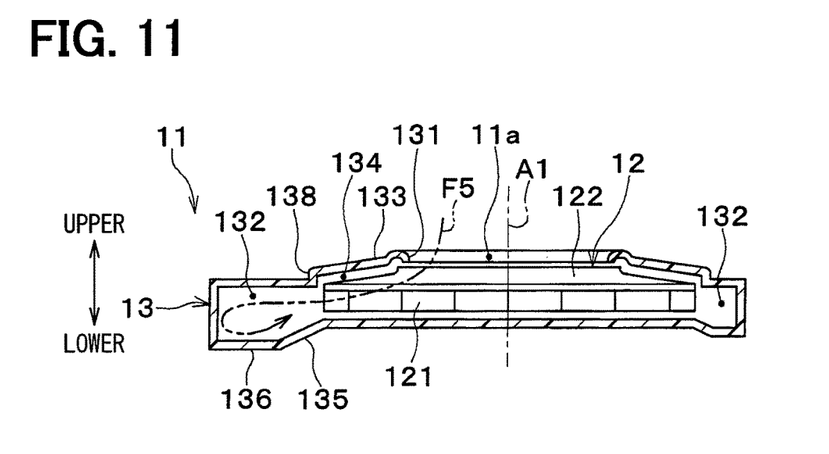
FIG. 11 is a cross-sectional view illustrating a blower according to a sixth embodiment.

According to the above-described embodiments, the air passage 132 is enlarged toward the one side in the axial direction (i.e., a side adjacent to the air suction port 11a). However, according to the present embodiment, as shown in FIG. 11, the air passage 132 is enlarged toward the other side in the axial direction (i.e., an opposite side from the air suction port 11a). That is, according to the present embodiment, the inclined portion 135 and the flat portion 136 are formed in the bottom surface of the blower casing 13.

In order to reduce a reverse flow from the air passage 132 toward the air suction port 11a through a clearance 134, a step portion 138 is formed in the upper surface of the blower casing 13 in a part near the outlet of each blade 121.

Accordingly, the part of the upper surface of the blower casing 13 located on the radial outer side of the step portion 138 in the radial direction is located, in the axial direction, on the other side (i.e., on a lower side in FIG. 11) of the part of the upper surface of the blower casing 13 located on the radial inner side of the step portion 138 in the radial direction.

In such a reverse-flow prevention structure, as indicated by the arrow F5 in FIG. 11, the blowing flow from the fan 12 has a velocity component toward the other side in the axial direction (i.e., downward in FIG. 11).

The air passage 132 is enlarged on the other side in the axial direction (i.e., downward in FIG. 11) such that the air passage 132 extends in a direction coinciding with a direction in which the blowing flow from the fan 12 flows. Consequently, the blowing flow can be swirled satisfactorily.

Seventh Embodiment

Figure 12:
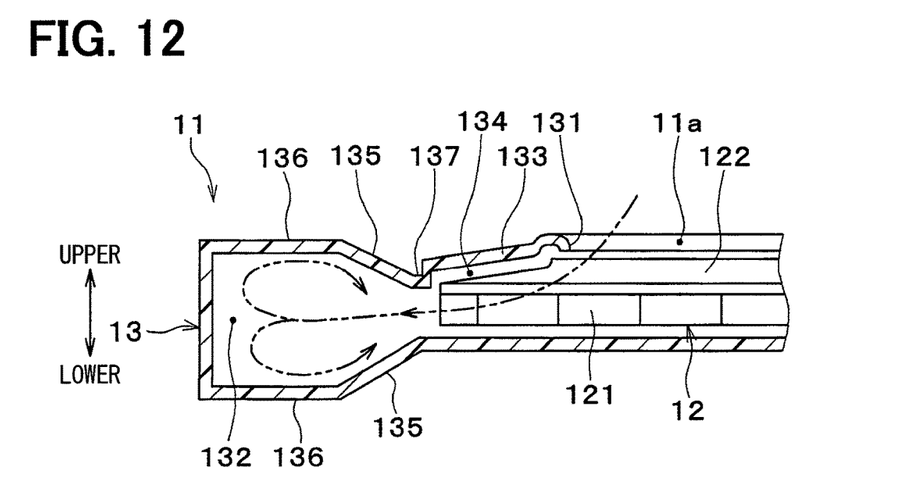
FIG. 12 is a cross-sectional view illustrating a blower according to a seventh embodiment.

According to the above-described embodiments, the air passage 132 is enlarged toward the one side in the axial direction (i.e., the side adjacent to the air suction port 11a) or on the other side (i.e. the opposite side from the air suction port 11a). However, according to the present embodiment, as shown in FIG. 12, the air passage 132 is enlarged toward both the one side (i.e., the side adjacent to the air suction port 11a) and the other side (i.e., the opposite side from the air suction port 11a) in the axial direction. That is, according to the present embodiment, both the upper surface and the bottom surface of the blower casing 13 have the inclined portion 135 and the flat portion 136.

With the structure, the blowing flow from the fan 12 can satisfactorily be swirled on both sides in the axial direction (i.e., on a upper side and a lower side in FIG. 12). In addition, fan efficiency can be further improved by enlarging a ventilation area.

Other Embodiments

The above-described embodiments can be combined with each other as required. For example, the present disclosure can be changed variously as follows.

(1) According to the above-described embodiments, the rotation axis A1 of the fan 12 is offset with respect to the center line CL of the blower casing 13. However, the rotation axis A1 of the fan 12 may be disposed on the center line CL of the blower casing 13.

(2) According to the above-described embodiments, an example in which the blower 11 is used for a vehicle seat air-conditioner is described. However, the blower 11 can be applied for various usages.

(3) According to the above-described embodiments, the blower 11 is designed to blow air in one direction from the air blowing outlet 11b. However, the blower 11 may blow air in various directions. For example, the blower 11 may radially blow air from various air blowing outlets.

What is claimed is:

1. A blower comprising:
a centrifugal multi-blade fan having blades around a rotation axis, the centrifugal multi-blade fan draws air from a radial inner side and blows the air to a radial outer side; and
a casing that houses the centrifugal multi-blade fan, wherein
the centrifugal multi-blade fan satisfies a relation of $d1/h1 \geq 5$, in which $d1$ is a diameter of a part having the blades, and $h1$ is a height of the blades in an axial direction of the rotation axis,
a part of the casing on one side in an axial direction of the centrifugal multi-blade fan has an air suction port that draws the air,
a part of the casing on the radial outer side of the centrifugal multi-blade fan has an air passage through which air blown from the centrifugal multi-blade fan flows,
the casing has an enlargement portion that enlarges the air passage on the one side in the axial direction as the casing extends toward the radial outer side,
a surface of the casing on the one side in the axial direction has a recessed portion that is recessed toward an other side in the axial direction and restricts a reverse flow of the air toward the air suction port from the air passage,
the recessed portion is disposed at a position between the enlargement portion and a radially outward end of the centrifugal multi-blade fan,
the recessed portion defines, together with the radially outward end of the centrifugal multi-blade fan, a first distance in a radial direction of the centrifugal multi-blade fan,
the first distance is smaller than a second distance defined between the recessed portion and a surface of the casing on the other side in the axial direction, and
the centrifugal multi-blade fan is a turbo fan in which each of the blades extends in a direction opposite to a rotation direction, the casing has a fan-facing portion on the one side of the casing, the fan-facing portion faces the centrifugal multi-blade fan with a clearance therebetween, and the clearance is smaller than the second distance, wherein the clearance has a radial length greater than a radial length of the recessed portion.

2. The blower according to claim 1, wherein
the enlargement portion enlarges the air passage on the one side in the axial direction, and
a distance between an end of the enlargement portion on the one side in the axial direction and the surface of the casing on the other side in the axial direction is longer than a distance between the air suction port and the surface of the casing on the other side in the axial direction.

3. The blower according to claim 1, wherein
the enlargement portion inclines at an angle in a range of 30° to 90° with respect to an imaginary plane perpendicular to the rotation axis.

4. The blower according to claim 1, wherein
the enlargement portion inclines at an angle in a range of 30° to 75° with respect to an imaginary plane perpendicular to the rotation axis.

5. The blower according to claim 1, wherein
the air passage has a smallest width part in which a width of the air passage in the radial direction of the centrifugal multi-blade fan is the smallest, and
when an angle formed between an imaginary plane perpendicular to the rotation axis and the enlargement portion is defined as an inclination angle, a first inclination angle, which is the inclination angle in an area within 90° from the smallest width part in a direction opposite to a rotation direction of the centrifugal multi-blade fan, is smaller than a second inclination angle, which is the inclination angle in a remaining area.

6. The blower according to claim 5, wherein
the first inclination angle is 30° or more.

7. The blower according to claim 1, wherein
the air passage has a smallest width part in which a width of the air passage in the radial direction of the centrifugal multi-blade fan is the smallest, and
when a height of a part forming the air passage in the casing in the axial direction of the centrifugal multi-blade fan is defined as a casing height, a first casing height, which is the casing height in an area within 90° from the smallest width part in a direction opposite to a rotation direction of the centrifugal multi-blade fan, is less than a second casing height, which is the casing height in a remaining area.

8. The blower according to claim 1, wherein
the recessed portion is formed in an upper surface of the casing and recessed toward a bottom surface of the casing.

9. The blower according to claim 1, wherein
the enlargement portion is inclined at a constant angle along an entire circumference of the centrifugal multi-blade fan.

10. The blower according to claim 1, wherein
the fan-facing portion extends in parallel with the centrifugal multi-blade fan such that the clearance has a portion with a fixed width.

11. The blower according to claim 1, wherein
the clearance inclines toward the air suction port.

12. The blower according to claim 1, wherein
the fan-facing portion extends in parallel with the centrifugal multi-blade fan such that the clearance has a portion with a fixed width.

13. The blower according to claim 1, wherein
the centrifugal multi-blade fan includes a side plate that is formed into a ring shape and covers one side of the blades,
the fan-facing portion is formed into a ring shape that extends along the ring shape of the side plate, and
the clearance is formed between the side plate and the fan-facing portion.

14. The blower according to claim 1, wherein
each of the blades is curved from the radial inner side toward the radial outer side of the centrifugal multi-blade fan in a direction away from the rotation direction.

15. A blower comprising:
a centrifugal multi-blade fan having blades around a rotation axis, the centrifugal multi-blade fan draws air from a radial inner side and blows the air to a radial outer side; and
a casing that houses the centrifugal multi-blade fan, wherein
the centrifugal multi-blade fan satisfies a relation of $d1/h1 \geq 5$, in which $d1$ is a diameter of a part having the blades, and $h1$ is a height of the blades in an axial direction of the rotation axis,
a part of the casing on one side in an axial direction of the centrifugal multi-blade fan has an air suction port that draws the air, a part of the casing on the radial outer side of the centrifugal multi-blade fan has an air passage through which air blown from the centrifugal multi-blade fan flows, the casing has an enlargement portion that enlarges the air passage on the one side in the axial direction as the casing extends toward the radial outer side, a surface of the casing on the one side in the axial direction has a recessed portion that is recessed toward an other side in the axial direction and restricts a reverse flow of the air toward the air suction port from the air passage, the recessed portion is disposed at a position between the enlargement portion and a radially outward end of the centrifugal multi-blade fan, the recessed portion defines, together with a surface of the casing on the other side, a distance in the axial direction, the casing has a fan-facing portion on the one side of the casing, the fan-facing portion faces the centrifugal multi-blade fan with a clearance therebetween, the clearance is smaller than the distance, wherein the clearance has a radial length greater than a radial length of the recessed portion, and the centrifugal multi-blade fan is a turbo fan in which each of the blades extends in a direction opposite to a rotation direction.

16. The blower according to claim 15, wherein the fan-facing portion extends in parallel with the centrifugal multi-blade fan such that the clearance has a portion with a fixed width.

17. The blower according to claim 15, wherein the clearance inclines toward the air suction port.

18. The blower according to claim 15, wherein the centrifugal multi-blade fan includes a side plate that is formed into a ring shape and covers one side of the blades, the fan-facing portion is formed into a ring shape that extends along the ring shape of the side plate, and the clearance is formed between the side plate and the fan-facing portion.

19. The blower according to claim 15, wherein each of the blades is curved from the radial inner side toward the radial outer side of the centrifugal multi-blade fan in a direction away from the rotation direction.

* * * * *